Figure 1:
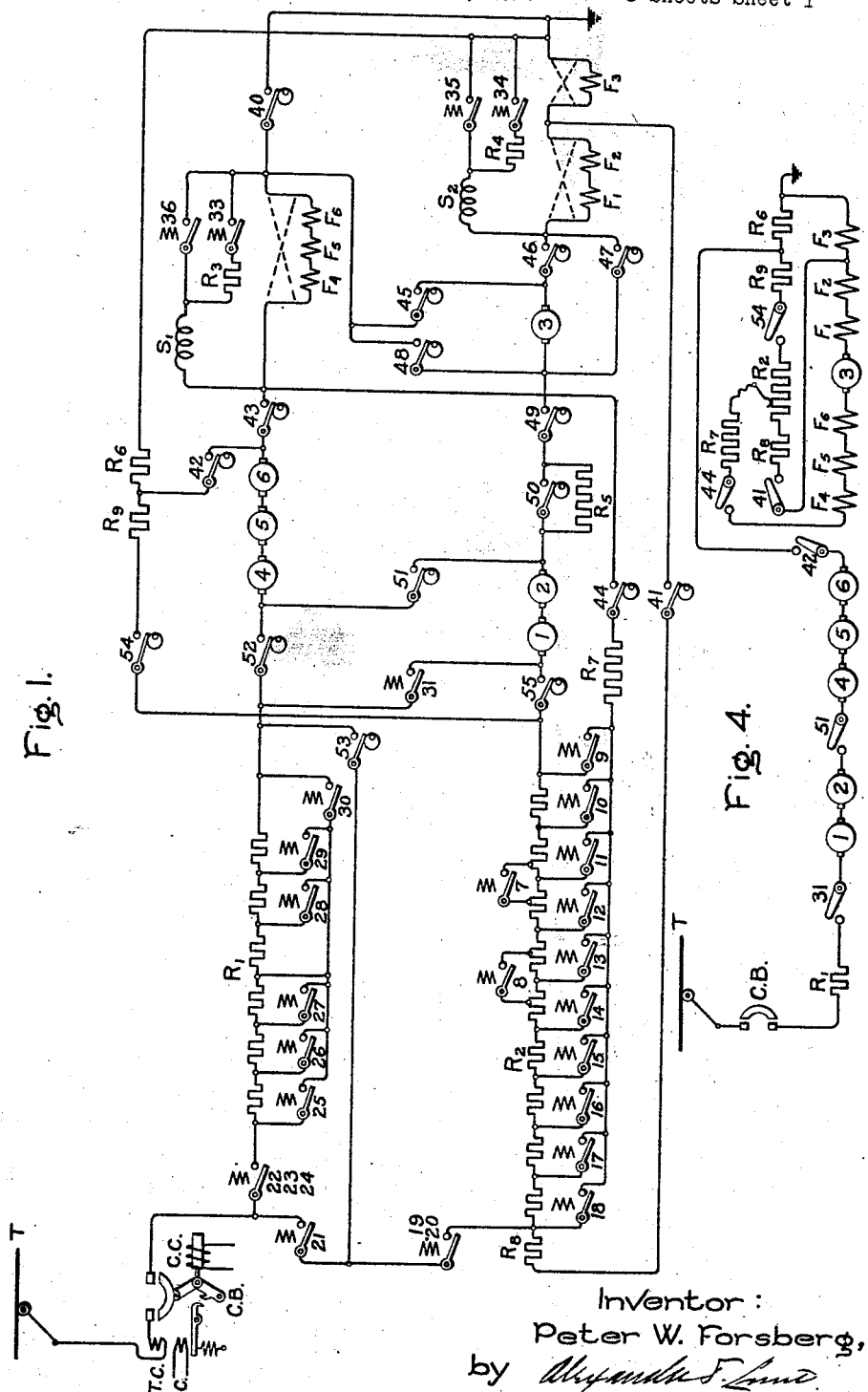

Fig. 2.

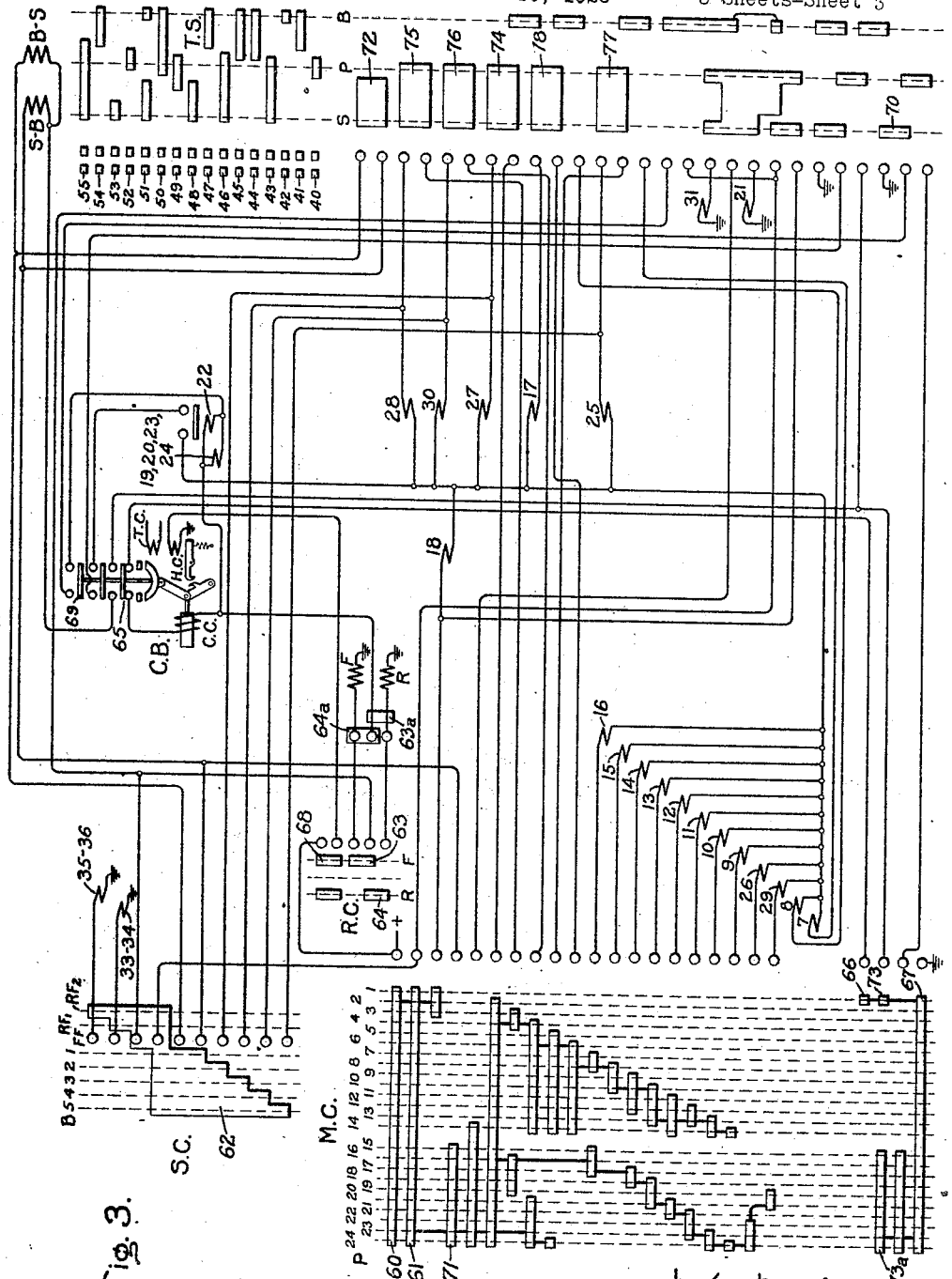

Patented June 1, 1926.

1,587,371

UNITED STATES PATENT OFFICE.

PETER W. FORSBERG, OF SCHENECTADY, NEW YORK, ASSIGNOR TO GENERAL ELECTRIC COMPANY, A CORPORATION OF NEW YORK.

MOTOR-CONTROL SYSTEM.

Application filed January 30, 1926. Serial No. 85,007.

My invention relates to the control of electric motors, particularly those employed in service wherein the motors operate to drive the load and also operate as generators to brake the load regeneratively when driven thereby.

The present invention is particularly advantageous in controlling the several driving motors of an electric locomotive or the like where a portion of the motors is employed to furnish exciting current to the remaining motors during regenerative braking operation of the locomotive, as is described and claimed in my Patent No. 1,421,931, although the present invention is not necessarily limited to such an arrangement.

In the control arrangement of my prior patent a plurality of manually operable controllers is employed in establishing the various motoring and regenerative braking connections of the motors, and the main controller is moved through the same successive operative positions during both braking and motoring operation, in order to control the same regulating resistors which are utilized in both operations.

My present invention provides improvements which enable certain of the regulating resistors to be controlled by the main controller only during motoring operation while the control thereof is transferred to an independently operable controller during regenerative braking operation. In this way a more flexible and convenient control of the locomotive is obtained during regenerative braking operation. This is particularly advantageous when service conditions require initiating regenerative braking of the locomotive at the lowest possible speed.

In carrying the invention into effect in a preferred form of locomotive control system, the interconnection of the driving motors in the various operating relations, such as series and parallel, during motoring operation, is controlled by a main controller which also varies the regulating resistors in circuit with the motor in order to vary the operating speed thereof. The interconnection of the motors in the regenerative braking relation is under the joint control of the main controller and a selective controller, and the main controller is arranged to control only the resistors employed in regulating the excitation of the motors during regenerative braking operation, while the independently operable selective controller is arranged to control the resistors which are connected in the regenerative braking circuit of the motors. Thus, after the motors are connected in the regenerative braking relation the main controller may be operated to equalize the regenerated voltage of the motors with the line voltage and the selective controller then may be operated to remove the current limiting resistors from the regenerative circuit to permit subsequent control of the regenerated voltage and consequently the regenerative braking effect by the main controller.

Figure 2:
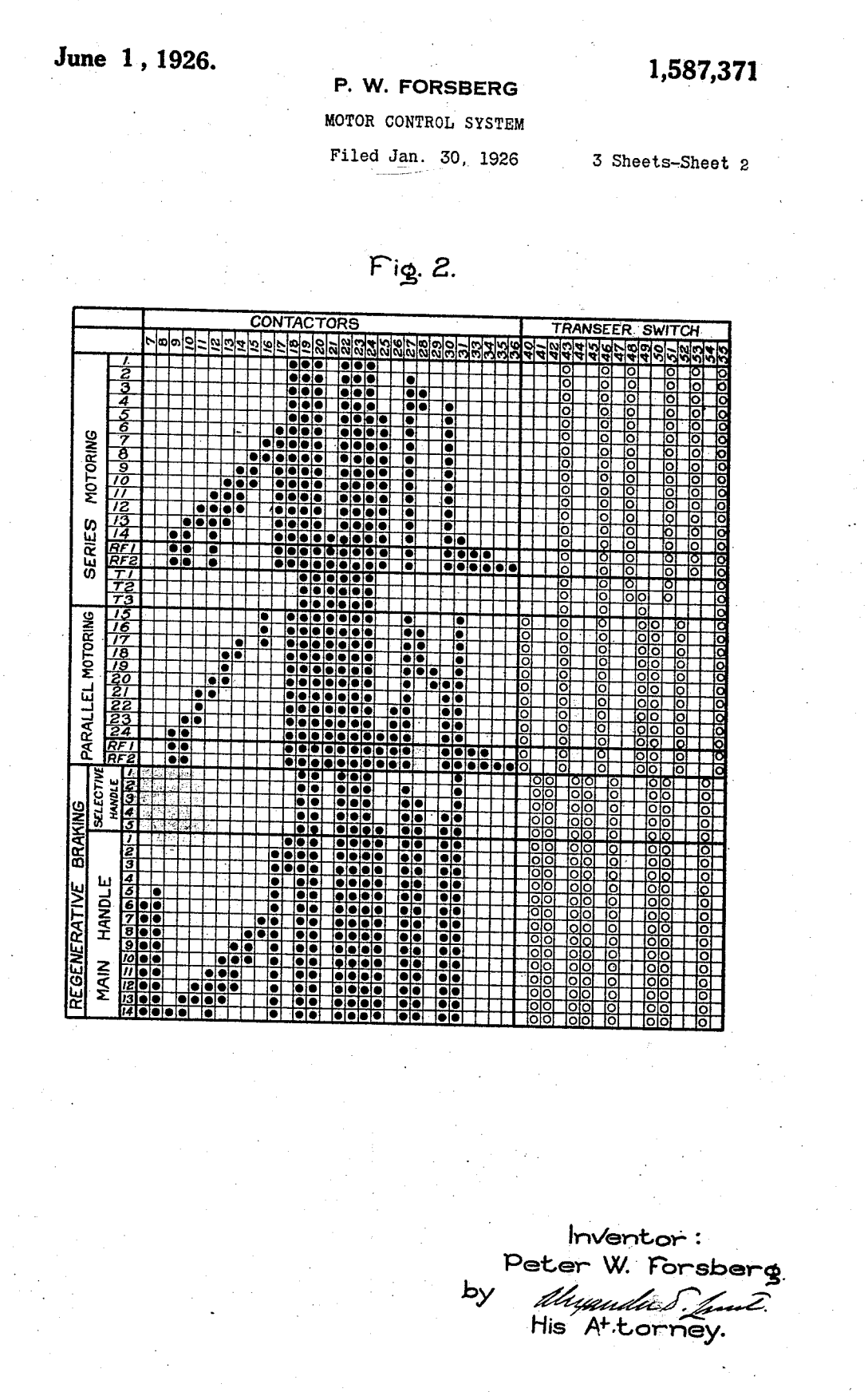

The invention will be better understood from a consideration of the accompanying drawings, in which Fig. 1 is a circuit diagram schematically showing the main motoring and regenerative braking circuits of an electric locomotive, together with the regulating resistors and controlling switch mechanism employed therein; Fig. 2 is a chart showing the sequence in which the various switches indicated in Fig. 1 are operated during both motoring and regenerative braking operation; Fig. 3 is a circuit diagram showing the manually operable controllers, as well as the circuits controlled thereby for effecting operation of the motor controlling switch mechanism in the proper sequence and Fig. 4 is a schematic diagram of the regenerative braking circuit connections.

As shown in Fig. 1, the locomotive driving motors 1, 2, 3, 4, 5 and 6, are of the direct current series type having field windings $F^1$, $F^2$, $F^3$, $F^4$, $F^5$, and $F^6$, respectively, and are arranged to receive power from the trolley T, through the overload circuit breaker C. B. in full series relation, as well as in parallel groups of three motors each, during motoring operation, with the resistors $R^1$, $R^2$, in circuit with the motors to regulate the operating speed thereon. For regenerative braking operation the motors 1, 2, 4, 5, and 6, are connected in series relation and the motor 3 is connected to overexcite the several field windings thereof in the manner described and claimed in my prior Patent No. 1,421,931, although the motors may be over-excited in any other suitable way if desired.

The interconnection of the motors in the several operating relations and the control of the regulating resistors R¹, R², are effected by the various switches illustrated diagrammatically in Fig. 1, some of which, as shown, are of the well known electromagnetically operated contactor type, while others are shown as cam operated contactors. The cam operated contactors are arranged to be actuated by a set of cams which are operated by an electrically controlled pneumatic engine in accordance with the usual practice, and these contactors constitute a transfer switch having a series and a parallel motoring position and also a braking position as indicated in Fig. 3. The operating cams T. S. and the electromagnetic controlling valves S—B and B—S of the transfer switch also are indicated in Fig. 3.

The reversing of the motor field connections as indicated by the dash lines in Fig. 1 is accomplished by a suitable reversing switch which preferably is of the usual electrically controlled pneumatically operated type, although this switch has been omitted from the drawing to avoid complication thereof.

The operation of the various motor and resistance controlling switches indicated in Fig. 1 is under the control of the manually operable main controller M. C., the selective controller S. C., and the reversing controller R. C., of which developments of the contact segments are shown in Fig. 3. In general, the main controller M. C. is arranged to operate the transfer switch T. S. and the electromagnetic contactors 9 to 36 to control the interconnection, as well as the speed, of the motors in both the series and parallel motoring relations. The reversing controller R. C. determines the direction of operation, while the selective controller S. C. cooperates with the main controller to effect reduced field motoring operation and also regenerative braking operation of the motors and, in accordance with the present invention, is arranged to separately control the operation of a portion of the resistance control contactors during braking operation of the motors. The precise manner in which the controllers effect operation of the various switches best may be understood from the following description of the operation of the control system.

In the first place, it may be noted that the electromagnetic control valve B—S is arranged to admit pressure to the pneumatic engine of the transfer switch when the operating winding thereof is deenergized. This insures that the transfer switch is operated from either the braking position B or the parallel position P to the series motoring position S when the manually operable controllers M. C. and S. C. occupy their respective "off" and "full field" positions in which they are shown.

To initiate motoring operation, the reversing controller R. C. first is operated into the forward position F or the reverse position R to select the desired direction in which the locomotive is to operate. The main controller M. C. then is moved into the first operative position. With the controller R. C. in the forward position F, this establishes an energizing circuit for the closing coil C. C. of the line circuit breaker C. B. extending from the control supply source + through the segments 60 and 61 of the main controller, the single segment 62 of the selective controller, the segments 63 and 64ª of the reversing controller, the winding C. C., contact 65, thence through segments 66 and 67 of the main controller, to ground. The circuit breaker immediately closes and is held closed when the contact 65 opens under the control of the tripping coil T. C. in the main motor circuit and the holding coil H. C., which is energized from the source + through the contact 68 of the reversing controller. At the same time, the energizing circuit for operating windings of electromagnetic contactors 19, 20, 22, 23, and 24 is completed through the contact 69 and the interlocking segment 70 of the transfer switch. Since the cam contactors 43, 46, 48, 51, 53, and 55 are closed with the transfer switch in position S, the driving motors are connected to receive current from the trolley T through the resistors R¹ and R² with the motors connected in full series operating relation. The advancement of the main controller through the successive operating positions 2 to 14 serves to establish energizing circuits for the electromagnetic resistance controlling contactors in the sequence indicated in Fig. 2, and thereby gradually removes the resistances R¹ and R² from the motor circuit.

In the sequence chart shown in Fig. 2 it will be observed that the resistance controlling contactors 27, 28, 30, 25, and 17 are closed successively as the main controller M. C. passes through positions 2, 3, 4, 5 and 6, and in the control diagram in Fig. 3 it will be seen that the energizing circuits for the operating windings of these contactors extend through the auxiliary interlocking segments 74, 75, 76, 77 and 78 respectively of the transfer switch. This group of resistance contactors is energized through the transfer switch segments only when the transfer switch is in the series or the parallel position. In the braking position of the transfer switch the control of this group of contactors is transferred to the selective controller S. C., as will be more fully pointed out hereinafter.

To operate the motors at a higher speed in the full series operating relation the selective controller S. C. may be moved from the full field running position in which it is shown into one of the reduced field positions $RF^1$, $RF^2$, in the first of which the electromagnetic contactors 33 and 34 are closed to shunt the motor field winding through the resistors $R^3$ and $R^4$ and the inductive shunts $S^1$ and $S^2$ respectively, and in the second of which the contactors 35 and 36 are closed to short circuit these resistors, thereby leaving only the shunts $S^1$ and $S^2$ in parallel with the field windings.

If service conditions warrant operation of the locomotive at a higher speed, the selective controller S. C. is returned to the full field position F. F. and the main controller is advanced into the first parallel position 15. In this position of the main controller both of the electromagnetic valve windings S—B and B—S are energized in parallel circuit from the supply source + through the segment 71, the circuit of the latter extending through the interlocking segment 72 of the transfer switch and the common return of the two windings extending through the contact 65 of the circuit breaker in its upper position and the segments $73_a$ and 67 of the main controller to ground. This results in the valve S—B admitting air to the pneumatic engine to move the transfer switch towards the braking position, while the valve B—S releases the pressure tending to maintain the transfer switch in the series position. In this way, the transfer switch is operated from position S. As position P is approached, the energizing circuit of valve winding B—S is interrupted at the segment 72 and the valve functions to admit pressure to stop the transfer switch in position P.

As the transfer switch is thrown from position S to P the cam contactors are operated to change the motor connections from the series to the parallel relation, as indicated in the transition steps $T^1$, $T^2$, $T^3$, of Fig. 2. Further advancement of the main controller through positions 16 to 24 serves to remove the resistors $R^1$, $R^2$, from the motor circuit in the sequence indicated in the parallel motoring portion of the chart shown in Fig. 2. Likewise, the reduced field operation of the motors in the parallel relation is effected by operation of the selective controller into either the reduced field positions $RF^1$ or $RF^2$.

When it is desired to initiate regenerative braking operation of the motors, the main controller MC is returned to the "off" position, thereby operating the transfer switch to interconnect the motors in the full series relation, if not already therein. The selective controller S. C. then is advanced into the first braking position $B^1$. This establishes energizing circuits for both of the electromagnetic valves S—B and B—S, extending from the supply source + through the segments 60, 61, of the main controller, segment 62 of the selective controller, and thence through the valve operating windings in parallel circuit, the contact 65 in its upper position and segments 73 and 67 of the main controller to ground. The valve S—B admits air to the transfer switch operating engine to move the switch from the series to the braking position and the valve B—S is maintained energized to release the air pressure tending to hold the braking switch in the series position.

As the transfer switch operates to the braking position the motor controlling cam contactors 41, 42, 44, 45, 47, 50, 51, 54 are closed and the electromagnetic contactors 18, 19, 20, 22, 23, 24, 25, 27, 28, 30 and 31 are operated to connect the armatures of motors 1, 2, 4, 5, 6, in series relation through the resistor $R^1$ and also $R^6$ to return braking current to the trolley T. At the same time the motor 3 is connected in a closed circuit including the fields $F^1$, $F^2$, $F^3$, $F^4$, $F^5$, $F^6$, with the resistor $R^2$, together with the resistors $R^7$, $R^8$, and $R^9$ connected in the circuit in the manner described in my prior patent and illustrated in Fig. 4.

With the transfer switch in the braking position, the control of the resistor $R^1$ is removed from the main controller M. C. and transferred to the selective controller S. C. The resistor $R^2$, however, remains under the full control of the main controller M. C. Thus, with the resistor $R^1$ in the motor circuit to limit the exchange of current between the motors and the trolley T, the main controller M. C. may be operated to vary the exciting current supplied to the field windings of the motors so as to bring the voltage generated by the motors 1, 2, 4, 5, 6, to a value substantially equal to or slightly in excess of that of the trolley T, even when the motors are operating at a very low speed. The selective controller then is advanced through the braking positions, 1, 2, 3, 4, 5, to successively operate the electromagnetic switches 27, 28, 30, 25, and thereby gradually remove the resistor $R^1$ from the braking circuit.

To increase the regenerative braking effect of the motors to the desired value, the main controller M. C. then is advanced to operate the electromagnetic resistance controlling contactors 7 to 17 in the sequence indicated in the regenerative braking portion of the chart shown in Fig. 2. This varies the point of connection of the resistor $R^9$ to the resistor $R^2$ and increases the over-excitation of the motor field windings thus causing the regenerated voltage and current of the latter to increase correspondingly.

As is fully pointed out and claimed in my prior Patent, No. 1,421,931, the braking current of the motors is regulated automatically to prevent a surge of current in case the potential of the trolley T should suddenly decrease for any reason. Briefly, this is due to the fact that the resistor $R^6$ is so proportioned that the drop of potential across this resistor upon an incipient increase in the braking current automatically decreases the excitation of the exciter field winding $F^3$, and thus in turn reduces the exciting current supplied by the motor 3.

Since the resistance $R^4$ in the regenerative braking circuit can be removed by operating the selective controller independently of the main controller, the regenerative voltage of the motors may be varied between wide limits by varying the excitation of the motor field windings through operation of the master controller M. C. without causing an excessive exchange of current between the motors and the supply lines. This is a distinct advantage when it is desired to initiate regenerative braking operation at the lowest possible speed of the motors.

What I claim as new and desire to secure by Letters Patent of the United States, is,—

1. The combination with a plurality of electric motors and a plurality of regulating resistors therefor, of switch mechanism for interconnecting the motors with said resistors in circuit therewith for both motoring and regenerative braking operation, means for controlling the said resistors and the said switch mechanism during motoring operation, and independently operable means cooperating with said first means to jointly control the said switch mechanism, and for separately controlling a portion of said resistors during regenerative braking operation of the motors.

2. The combination with a plurality of electric motors adapted for motoring and regenerative braking operation, of a plurality of regulating resistors for the motors, a controller having a plurality of operating positions for interconnecting the motors with said resistors for motoring operation and for controlling said resistors to vary the operating speed of the motors, and an independently operable controller arranged to cooperate with said first controller to interconnect the motors in the braking relation with said resistors in circuit therewith and for separately controlling a portion of the said resistors to vary the braking current of the motors.

3. The combination with a plurality of electric motors adapted for motoring operation and for regenerative braking operation with a portion of the motors operating as exciters for the other motors, of a plurality of regulating resistors, a controller for interconnecting the motors for motoring operation and for controlling the said resistors to vary the operating speed of the motors, and an independently operable controller cooperating with said first controller for interconnecting the motors in the braking relation with one portion of the said resistors in the braking circuit and another portion of the resistors in the excitation circuit, said independently operable controller being arranged to separately control the portion of the resistors in the braking circuit.

4. The combination with a plurality of electric motors and a plurality of regulating resistors therefor, of switch mechanism for interconnecting said motors in series and parallel relation for motoring operation with said resistors in the motor circuit and for connecting a portion of the motors to overexcite the remaining motors with one portion of said resistors in the braking circuit and another portion of the resistors in the excitation circuit for regenerative braking operation, a controller having a plurality of operative positions for controlling said resistors during motoring operation and for controlling the said portion of the resistors in the excitation circuit during braking operation, and an independently operable controller arranged to separately control the portion of the resistors in the braking circuit.

5. In a control system for a plurality of electric motors adapted for motoring operation and for regenerative braking operation with a portion of the motors acting as exciters for the other motors, the combination of a plurality of resistors, switch mechanism for connecting said resistors in the motor circuit during motoring operation and for controlling the resistors to vary the operating speed of the motors, and independently operable switch mechanism cooperating with said first switch mechanism to connect one portion of said resistors in the motor circuit and another portion of said resistors in the excitation circuit of the motors for regenerative braking operation and for separately controlling the portion of the resistors in the motor circuit to control the braking current of the motors.

6. The combination with a plurality of direct current series motors and a plurality of regulating resistors therefor, of switch mechanism for connecting the resistors in series with the motors for motoring operation and for connecting one portion of the resistors in series with one portion of the armatures of the motors to form a braking circuit and another portion of the resistors in series with the other portion of the armatures and the field windings of the motors to form an excitation circuit, a controller having a plurality of operative positions for controlling said resistors to vary the speed of the motors during motoring operation and for controlling the portion of said resistors in the excitation circuit during braking operation, and a separately operable controller having a plurality of operative positions for separately controlling the portion of said resistors in the braking circuit.

7. The combination with a plurality of direct current series motors and a plurality of regulating resistors therefor, of electroresponsive switch mechanism for connecting the motors in series and in parallel relation with said resistors in circuit therewith for motoring operation and for interconnecting a portion of the motors to excite the remaining motors with one portion of said resistors in the braking circuit and another portion of the resistors in the excitation circuit for regenerative braking operation, a pair of separately operable controllers each having a plurality of operative positions, and connections through which one of the controllers controls the operation of said electroresponsive switch mechanism during motoring operation and said controllers control said electroresponsive switch mechanism during regenerative braking operation with one of the controllers separately controlling a corresponding portion of the resistors.

In witness whereof, I have hereunto set my hand this 13th day of January, 1926.

PETER W. FORSBERG.